United States Patent [19]
Kan et al.

[11] Patent Number: 5,872,804
[45] Date of Patent: Feb. 16, 1999

[54] SOLID-STATE LASER AMPLIFIER

[75] Inventors: Hirofumi Kan, Hamamatsu; Yasukazu Izawa, 2-8-417, Hashinouchi, Ibaraki-shi, Osaka 567; Masanobu Yamanaka; Hiromitsu Kiriyama, both of Minoo; Takuji Yoshida, Kawanishi; Sadao Nakai, 6-45, Kitakasugaoka 3-chome, Ibaraki-shi, Osaka 567; Chiyoe Yamanaka, Osaka, all of Japan

[73] Assignees: Hamamatsu Photonics K.K., Hamamatsu; Institute for Laser Technology, Osaka; Sadao Nakai, Osaka; Yasukazu Izawa, Osaka, all of Japan

[21] Appl. No.: 895,923

[22] Filed: Jul. 17, 1997

[30] Foreign Application Priority Data

Jul. 18, 1996 [JP] Japan ................................. 8-189631

[51] Int. Cl.$^6$ .................................................. H01S 3/081
[52] U.S. Cl. .............................. 372/93; 372/94; 372/106; 372/75
[58] Field of Search ................................. 372/93, 94, 99, 372/106, 70–75, 27

[56] References Cited

U.S. PATENT DOCUMENTS

| | | | |
|---|---|---|---|
| 4,710,940 | 12/1987 | Sipes, Jr. | 372/75 |
| 4,955,034 | 9/1990 | Scerbak | 372/94 |
| 5,249,196 | 9/1993 | Scheps | 372/93 |
| 5,610,936 | 3/1997 | Cantoni | 372/93 |

OTHER PUBLICATIONS

IEEE Journal of Quantum Electronics. vol. 30. No. 4, Apr. 1994 Compact, Single–Frequency, High–Power ND: Glass Laser, V.P. Yanovsky et al, pp. 884–886.

Institute of Laser engineering, Osaka University (2–6 Yamada–Oka, Suita, Osaka 565) Two–Dimensional Thermal Stress–Induced Birefringence Measurement and Its Compensation Experiment in the Laser–Diode Pumped Solid–State Laser Materials, H.Kiriyama et al., pp. 343–352, May 1996.

*Primary Examiner*—Hemang Sanghavi
*Attorney, Agent, or Firm*—Pillsbury Madison & Sutro LLP

[57] ABSTRACT

A passive eight-pass solid-state laser amplifier is constructed using a quarter-wave plate (11), a total reflection mirror (12), a polarization beam splitter (5), and a total reflection mirror (6) while input/output faces of a hexagonal zigzag slab solid-state laser medium (15) optically pumped are kept nearly perpendicular to pulsed laser light. Thermal birefringence takes place in the laser medium (15) optically pumped with good symmetry by flash lamps or LDs (9) and is compensated for by a quartz 90° rotator (10). Linearly s-polarized laser light reflected by a polarization beam splitter (3) is output as pulsed laser output light (13) to the outside. Owing to this, saturation laser amplification can be achieved using output laser light from a pulsed laser oscillator of relatively low output, as source light.

3 Claims, 2 Drawing Sheets

SOLID-STATE LASER AMPLIFIER

BACKGROUND OF THE INVENTION

1. Field of the Invention

The present invention relates to a flash-lamp-pumped or laser-diode-pumped solid-state laser amplifier with thermal birefringence compensation.

2. Related Background Art

A known, flash-lamp-pumped, passive four-pass Nd: glass solid-state laser amplifier is, for example, the one described in IEEE Journal of Quantum Electronics, Vol. 30, No. 4, pp. 884–886, 1994. Further, a method for compensating for thermal birefringence occurring in a laser diode (LD) pumped Nd: glass solid-state laser medium by using a quartz 90° rotator is, for example, the one described in Review of Laser Engineering, Vol. 24, No. 3, pp. 343–352, 1996.

FIG. 2 is a schematic plan view to show the configuration of a passive four-pass solid-state laser amplifier with thermal birefringence compensation in the prior art. In this solid-state laser amplifier, solid-state laser media (which are normally of a solid-state laser material doped with active elements such as Nd, Yb, Ho, or Er, or the like) 7 and 8 optically pumped by light sources (pumping sources) 9 such as flash lamps or LDs have the same dimensions and are optically pumped in the same state. Owing to this, thermal birefringence is produced in the same distribution in the laser media 7 and 8.

The operation of the solid-state laser amplifier of FIG. 2 will be described. Source light 2 as p-polarized light (light polarized in the horizontal direction) from pulsed laser oscillator 1 passes through polarization beam splitter 3 without loss and is then incident to Faraday rotator 4. By this, the azimuth of the source light is rotated by 45°. After this, the azimuth angle of the source light is further rotated 45° by half-wave plate 20 in the opposite direction to the direction of rotation by the Faraday rotator 4, so that the source light becomes p-polarized light again. After that, the source light passes through polarization beam splitter 5 without loss.

The source light emerging from the polarization beam splitter 5 is incident to the optically pumped laser media 7 and 8 in order, thereby being amplified and being affected by the thermal birefringence in the laser media 7 and 8. However, since the laser media 7 and 8 have the same thermal birefringence distribution and since quartz 90° rotator 10 is provided midway between the laser media 7 and 8, this quartz 90° rotator 10 compensates for the thermal birefringence effect due to these laser media. Specifically describing, by the thermal birefringence effect of the laser medium 7, the linearly polarized light incident thereto is emerged as elliptically polarized light. Without the rotator 10, thus ellipitically polarized light incident to the laser medium 8 is emerged as much distortion light. In contrast, when the rotator 10 is provided, the thermal birefringence is compensated for, so that the light emerging from the laser medium 8 to the right is linearly s-polarized light (light polarized in the vertical direction). In this case, the thermal lens effect usually takes place in the optically pumped laser media 7 and 8, but the thermal lens effect can be neglected if the focal length of this thermal lens is sufficiently longer than the length of the laser amplifier. If the focal length of the thermal lens is short, the thermal lens effect can be compensated for readily by disposing a concave lens near 90° rotator 10. Therefore, no problem is posed in compensating for the thermal birefringence by the 90° rotator 10.

The amplified, pulsed laser light emerging as s-polarized light from the laser medium 8 to the right then passes through quarter-wave plate 11 to the right to become circularly polarized light. Then the laser light is reflected by total reflection mirror 12 to change the traveling direction to the left. This reflected laser light of circularly polarized light passes through the quarter-wave plate 11 to the left to become p-polarized light. This p-polarized light then passes through the optically pumped laser medium 8, the 90° rotator 10, and the optically pumped laser medium 7 in order, thereby being amplified again. The thermal birefringence caused in the laser media is also compensated for here by the rotator 10, so that this laser light becomes s-polarized light to be emitted from the laser medium 7 to the left.

After this, the laser light is totally reflected by the polarization beam splitter 5 to be incident to total reflection mirror 6. It is reflected here and thereafter is incident again to the polarization beam splitter 5 to be reflected totally, thereby traveling to the right. Owing to this, this laser light of s-polarized light is subject to third optical amplification by the laser media 7 and 8 and the thermal birefringence is compensated for by the 90° rotator 10. Thus, the laser light becomes p-polarized light when it is emitted from the laser medium 8 to the right. Next, this p-polarized laser light passes the quarter-wave plate 11 forward and backward through reflection at the total reflection mirror 12 to become s-polarized light and to be incident again to the laser medium 8. This laser light passes through the laser media 8 and 7 in order to the left to be subject to fourth optical amplification and compensation for the thermal birefringence by the 90° rotator 10, thereby becoming p-polarized light to be emitted from the laser medium 7 to the left.

This amplified, p-polarized, pulsed laser light passes through the polarization beam splitter 5 without loss and then passes through the half-wave plate 20 to the left. Owing to this, the azimuth angle of the laser light is rotated 45° to return to the original azimuth angle. However, the azimuth angle is further rotated 45° during passage through the Faraday rotator 4 to the left, so that the azimuth angle is rotated 90°, turning the laser light to s-polarized light. This laser light is emitted from the Faraday rotator 4 to the left and is totally reflected by the polarization beam splitter 3. This obtains the pulsed laser output light 13 of linearly s-polarized light.

In the passive four-pass solid-state laser amplifier with thermal birefringence compensation of FIG. 2, however, optical power of the source light, i.e., the pulsed laser output of laser oscillator 1, must be considerably high in order to sufficiently extract energy accumulated in the laser media as achieving saturation amplification, and there are demands for realization of a solid-state laser amplifier that can achieve saturation amplification by lower power of the source light.

The present invention has been accomplished to meet such demands and an object of the present invention is to realize a solid-state laser amplifier that can achieve saturation laser amplification using output laser light from a pulsed laser oscillator of relatively low output, as the source light.

SUMMARY OF THE INVENTION

A solid-state laser amplifier of the present invention is a solid-state laser amplifier for amplifying laser light by making the laser light incident to a laser medium irradiated by pumping light from a pumping source, wherein the laser medium is a block or plate a cross section of which is of a hexagon; wherein side faces of the hexagon are comprised of first and second reflecting side faces opposite to each other, first and second input/output side faces adjacent to each other on one side between the two reflecting side faces, and third and fourth input/output side faces adjacent to each other and opposite to the first and second input/output side faces; and wherein the laser light to be amplified is made repetitively incident to and emergent from the laser medium through the first to fourth input/output side faces, the laser light to be amplified, thus made incident, is reflected alternately by internal surfaces of the first and second reflecting side faces, and the laser light is emitted to the outside after at least eight passes in the laser medium.

Since the solid-state laser amplifier of the present invention is arranged to make the laser light to be amplified travel in the laser medium by eight passes greater than heretofore, as described above, the amplification factor of laser light becomes very large.

The laser amplifier of the present invention may further comprise two mirrors disposed opposite to each other on output optical paths of the third and fourth input/output side faces, the two mirrors guiding output light from one side face of either the third or fourth input/output side face to the other side face; and a 90° rotator disposed between the mirrors; wherein the laser medium is so arranged that the first and second reflecting side faces are parallel to each other, the laser medium having a substantially symmetric shape with respect to a longitudinal axis parallel to these reflecting side faces; wherein the pumping source comprises light sources positioned substantially in symmetry with respect to the longitudinal axis; and wherein the laser light to be amplified is linearly polarized laser light polarized in a predetermined first direction; the laser light being made incident to the laser medium through the first input/output side face.

With this configuration, a thermal birefringence distribution symmetric with respect to the symmetry axis of the shape is formed in the laser medium and optical paths of reflection of light incident through the first or second input side face are also formed in an almost symmetric shape. Since the 90° rotator is located midway between these optical paths in the medium, the laser light converted into elliptically polarized light by the thermal birefringence caused in the medium can be turned back to linearly polarized light, so that the thermal birefringence effect can be compensated for properly.

Further, the solid-state laser amplifier according to the present invention may further comprise first optical path switching means disposed on a main optical path connecting a light source of the laser light to be amplified with the laser medium, the first optical path switching means separating a linearly polarized light component in a second direction perpendicular to the first direction from incident light to output the linearly polarized light component on a first sub optical path different from the main optical path, thereby extracting only a linearly polarized light component in the first direction and outputting the linearly polarized light component in the first direction on the main optical path; polarization direction converting means disposed between the first optical path switching means on the main optical path and the laser medium, the polarization direction converting means rotating a direction of polarization of the laser light to be amplified, emitted from the first optical path switching means, by 90° about a traveling direction of the light; second optical path switching means disposed between the polarization direction converting means on the main optical path and the laser medium, the second optical path switching means separating a linearly polarized light component in the first direction from incident light and outputting the linearly polarized component in the first direction on a second sub optical path different from the main optical path, thereby extracting only a linearly polarized light component in the second direction and outputting the linearly polarized light component in the second direction on the main optical path; reentering means disposed on the second sub optical path, the reentering means guiding the laser light to be amplified, having been emitted from the first input/output side face of the laser medium and having been incident via the second optical path switching means into the second sub optical path, to the main optical path; and polarization direction converting/reentering means disposed on an output optical path of the second input/output side face of the laser medium, the polarization direction converting/reentering means rotating a direction of polarization of output light by 90° and thereafter making the output light reenter the laser medium through the second input/output side face.

This configuration permits changeover between the optical path for repetitive passes of the laser light in the laser medium and the optical path for outputting the laser amplified light, depending upon the difference of polarization state of the laser light to be amplified, whereby the laser light amplified after the predetermined number of passes in the laser medium can be output to the outside, making use of the difference of polarization state.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENT

Figure 1:
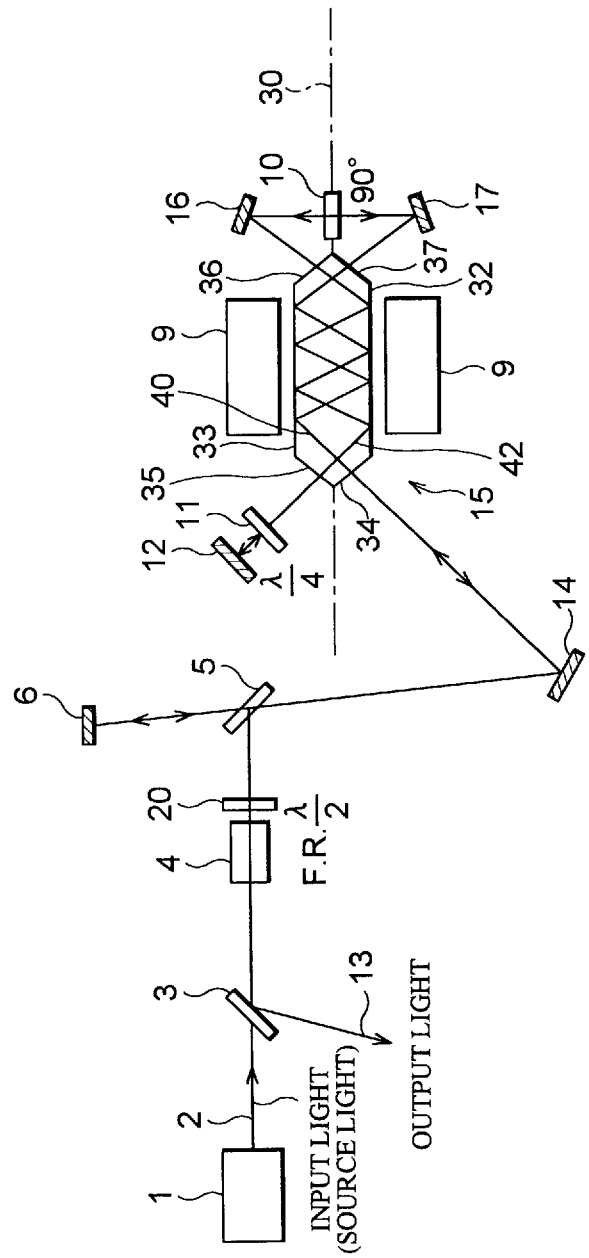
FIG. 1 is a schematic plan view to show the configuration of a passive eight-pass solid-state laser amplifier with thermal birefringence compensation according to an embodiment of the present invention.
Figure 2:
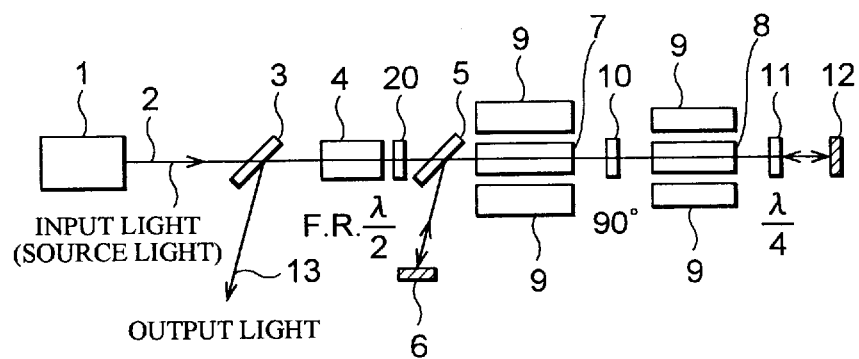
FIG. 2 is a schematic plan view to show the configuration of the four-pass solid-state laser amplifier with thermal birefringence compensation according to the conventional example.

The embodiment of the present invention will be described in detail with reference to the accompanying drawing. In the description of the drawing the same elements will be denoted by the same reference symbols and redundant description will be omitted.

FIG. 1 is a schematic plan view to show the configuration of the embodiment of the passive solid-state laser amplifier according to the present invention. This solid-state laser amplifier has the main constituent elements including laser medium 15 and two pumping sources 9 which emit optical pumping light to the laser medium 15. Further, FIG. 1 illustrates pulsed laser oscillator 1 for pulse-oscillating source light 2 to be amplified (amplified light) to inject it into the solid-state laser amplifier.

The laser medium 15 is a parallel-plane-plate slab solid medium having an upper surface and a lower surface, of generally a hexagon. This laser medium 15 is normally made of a material doped with active elements such as Nd, Yb, Tm, Ho, or Er, or the like. In FIG. 1 the chain line indicated by reference numeral 30 is the longitudinal axis of laser medium 15, and the laser medium 15 has an elongated shape along this longitudinal axis 30 and has two opposite side faces 32 and 33 extending in parallel to each other along the longitudinal axis 30. As shown in FIG. 1, the laser medium 15 has the symmetric shape up and down (in the view of FIG. 1) with respect to the symmetry axis of the longitudinal axis 30. Side face 34 connected to the side face 32 and side face 35 connected to the state face 33 are located adjacent to each other and in symmetry with respect to the longitudinal axis 30. This is also the case as to side faces 36 and 37.

As will be described hereinafter, the side faces 32 and 33 have a function to reflect the source light (amplified light) incident to the laser medium 15 by their internal surfaces. The side faces 34 to 37 are provided so that the amplified light is incident to the laser medium 15 or is emitted from the laser medium 15 through these faces, and they work each as an input/output face of light. The source light from the laser oscillator 1 is first incident through the input/output side face 34 into the medium 15. Quauter-wave plate 11 and total reflection mirror 12 are installed at positions opposite to the input/output side face 35. Further, total reflection mirrors 16, 17 are located at positions opposite to the input/output side faces 36, 37, respectively, and the light reflected by one of these two total reflection mirrors travels toward the other total reflection mirror to be reflected thereby and then to reenter the laser medium 15. Further, quartz 90° rotator 10 for compensating for the thermal birefringence effect occurring in the laser medium 15 is positioned on the optical path between the total reflection mirrors 16 and 17.

By arranging the various optical components as described above, two zigzag optical paths 40 and 42 symmetric (in the view of FIG. 1) with respect to the longitudinal axis 30 are formed in the laser medium 15. The source light incident to the laser medium 15 is amplified as repetitively passing almost on the two optical paths in the medium, though possibly deviating slightly depending upon a change of environment (the temperature of the medium etc.).

The two pumping sources 9 for optically pumping the laser medium 15 are of the same kind and are positioned substantially in symmetry (in the view of FIG. 1) up and down with respect to the longitudinal axis 30. Owing to this, when the pumping light from the pumping light sources 9 is injected into the laser medium 15, the population inversion and thermal birefringence distribution are formed nearly in symmetry with respect to the longitudinal axis 30 in the laser medium 15. The pumping sources 9 are usually selected from flash lamps and laser diodes (LDs).

On the optical path between the laser oscillator 1 and the laser medium 15 there are polarization beam splitter 3, Faraday rotator 4, half-wave plate 20, polarization beam splitter 5, and total reflection mirror 14 positioned in this order from the side of laser oscillator 1.

The polarization beam splitters 3 and 5 have an function to selectively transmit or reflect incident light, depending upon the direction of polarization thereof and the splitters adopted herein are those for transmitting linearly polarized light having the plane of polarization parallel to the upper face of the laser medium 15 (as will be referred hereinafter as "p-polarized light") and for reflecting linearly polarized light having the plane of polarization perpendicular to the upper face of laser medium 15 (as will be referred hereinafter as "s-polarized light").

The Faraday rotator 4 placed on the optical path between the polarization beam splitters 3 and 5 has a function to rotate the direction of polarization of linearly polarized light 45° about the axis along the traveling direction of the linearly polarized light incident thereto. The half-wave plate 20 positioned on the optical path between the Faraday rotator 4 and the polarization beam splitter 5 rotates the direction of polarization of p-polarized light incident from the left (and s-polarized light incident from the right) (in the view of FIG. 1) 45° in the same direction as (and in the opposite direction to) the rotating direction of the polarization direction by the Faraday rotator 4.

The total reflection mirror 6 is located opposite to the polarization beam splitter 5 and at the position where the light, having traveled nearly perpendicular to the input/output side face 34 of laser medium 15, having been reflected by the total reflection mirror 14, and having been transmitted by the polarization beam splitter 5, arrives. The total reflection mirror 6 reflects p-polarized light from the laser medium 15, having been transmitted by the polarization beam splitter 5, to make it reenter the laser medium 15.

Next, the operation of the solid-state laser amplifier of this embodiment will be described. The pulsed laser oscillator 1 outputs p-polarized source laser light 2 and this source laser light 2 passes through the polarization beam splitter 3 without loss to the right in FIG. 1 and thereafter enters the Faraday rotator 4. The direction of polarization of this source laser light is rotated 45° in its azimuth angle during rightward travel through the Faraday rotator 4 and is further rotated 45° in the azimuth angle in the same direction by the half-wave plate 20, thus becoming s-polarized light. The source laser light thus converted to the s-polarized light is totally reflected by the polarization beam splitter 5 and is then reflected by the total reflection mirror 14 to be incident at an angle of incidence nearly perpendicular to the input/output side face 34 of the laser medium 15.

This pulsed laser light is subject to first amplification while traveling on the first zigzag optical path 40 in the laser medium 15 as alternately being reflected by the reflecting side faces 32 and 33, and the state of polarization thereof is converted from the linearly s-polarized light to elliptically polarized light by the thermal birefringence effect. The laser light having become the elliptically polarized light is emitted through the input/output side face 36 and is then reflected by the total reflection mirror 16 to travel toward the 90° rotator 10. This laser light passes through the rotator 10 to be subject to 90° rotation of the azimuth angle of polarization and is then reflected by the total reflection mirror 17 to travel toward the laser medium 15. Thus, the laser light is incident nearly perpendicularly to the input/output side face 37 to travel on the second zigzag optical path 42.

As described above, the first and second zigzag optical paths 42 lie in symmetry with respect to the longitudinal axis 30 and the laser medium 15 is pumped in symmetry with respect to the longitudinal axis 30 by the pumping sources 9. Therefore, the laser light reentering the medium 15 through the input/output side face 37 passes substantially the same laser gain section and thermal birefringence distribution section as in the first pass, thereby being subjected to second amplification. On this occasion, the laser light is compensated for the thermal birefringence effect caused in the first amplification, thereby becoming linearly p-polarized light. The laser light thus converted into the p-polarized light is emitted nearly perpendicularly from the input/output side face 35, then passes through the quarter-wave plate 11, thereafter is reflected by the total reflection mirror 12, again passes through the quarter-wave plate 11 to be converted thereby into s-polarized light, and is then incident nearly perpendicularly to the input/output side face 35.

The laser light thus reentering the laser medium 15 travels on the second zigzag optical path 42, is then emitted nearly perpendicularly from the input/output side face 37, travels via the total reflection mirror 17, 90° rotator 10, and total reflection mirror 16 to reenter the laser medium 15 through the input/output side face 36, and again passes on the first zigzag optical path 40. The pulsed laser light is further amplified during the third pass along the zigzag optical path 42 and during the fourth pass along the zigzag optical path 40. During these passes the thermal birefringence effect is also compensated for by the action of the 90° rotator 10, as described above.

The laser light thus becoming the p-polarized light is emitted through the input/output side face 34, is then reflected by the total reflection mirror 14, and thus travels toward the polarization beam splitter 5. After this, the laser light passes through the polarization beam splitter 5 without loss to travel toward the total reflection mirror 6 and to be reflected thereby. Then the laser light again passes through the polarization beam splitter 5 without loss, thereafter is totally reflected by the total reflection mirror 14, and then travels toward the laser medium 15. In this way the pulsed laser light of the p-polarized light reenters the input/output side face 34 nearly perpendicularly thereto and travels in the same way as in the case of the first incidence.

The pulsed laser light is further amplified during the fifth pass along the zigzag optical path 40 and during the sixth pass along the zigzag optical path 42 and the thermal birefringence effect is compensated for by the 90° rotator 10. By this, the pulsed laser light is converted into s-polarized light and is emitted through the input/output side face 35. This s-polarized laser light passes through the quarter-wave plate 11 twice forward and backward to be converted into p-polarized light and then reenters the input/output side face 35 nearly perpendicularly thereto. The above is the same as in the case of the first and second passes.

The p-polarized laser light thus reentering the laser medium 15 is laser-amplified during the seventh pass along the zigzag optical path 42 and during the eighth pass along the zigzag optical path 40 and the thermal birefringence effect is compensated for by the action of the 90° rotator 10. This results in finally emitting the laser amplified light of s-polarized light through the input/output side face 34.

This s-polarized laser light is totally reflected by the total reflection mirror 14, thereafter is totally reflected by the polarization beam splitter 5, and then travels toward the half-wave plate 20. This laser light passes through the half-wave plate, where the azimuth thereof is rotated 45° in the reverse direction. Subsequently, while next passing the Faraday rotator 4, the laser light is rotated 45° in the opposite direction. As a result, this laser light remains a state wherein the direction of polarization is rotated 90° relative to the source light 2 (p-polarized light) from the laser oscillator 1, i.e., s-polarized light. This s-polarized laser light is totally reflected by the polarization beam splitter 3 to be output as pulsed laser output light 13.

As described above, in the solid-state laser amplifier carrying out the present invention, the number of times that the amplified light passes in the laser medium (the number of passes) is 8, which is doubled from 4 heretofore. Therefore, the amplification efficiency of the amplified light is very high. Owing to this, saturation laser amplification can be achieved even using high-quality laser output light from a pulsed laser oscillator of relatively low output, as source light, and the energy accumulated in the laser medium can be extracted at high efficiency. By the arrangement wherein the optical component for compensating for the thermal birefringence effect (the 90° rotator in the present embodiment) is positioned in the return optical path of the amplified light provided opposite to the suitable input/output side faces of the laser medium as in the present embodiment, influence of the thermal birefringence can be eliminated and the laser amplification can be made at higher efficiency.

If in the above arrangement the thermal lens effect appears in the optically pumped laser medium 15, the thermal lens effect can be compensated for by locating a concave lens on the optical path before or after the quartz 90° rotator 10. Therefore, the thermal birefringence effect can also be compensated for in the case.

As detailed above, the present invention can realize the eight-pass solid-state laser amplifier with the greater number of passes than before by using the laser medium of the nearly hexagonal cross section and using a passive material without using an active electrooptic element, and the present invention can achieve the saturation laser amplification readily even in use of the output laser light from the pulsed laser oscillator of relatively low output as source light.

From the invention thus described, it will be obvious that the invention may be varied in many ways. Such variations are not to be regarded as a departure from the spirit and scope of the invention, and all such modifications as would be obvious to one skilled in the art intended for inclusion within the scope of the following claims.

The basic Japanese application No. 189631/1996 filed on Jul. 18, 1996 is hereby incorporated by reference.

What is claimed is:

1. A solid-state laser amplifier for amplifying laser light by making the laser light incident to a laser medium irradiated by pumping light from a pumping source, wherein said laser medium is a block or plate which has a cross section of a hexagon;

wherein side faces of the hexagon are comprised of first and second reflecting side faces opposite to each other, first and second input/output side faces adjacent to each other on one side between said two reflecting side faces, and third and fourth input/output side faces adjacent to each other and opposite to said first and second input/output side faces; and wherein the laser light to be amplified is made repetitively incident to and emergent form said laser medium through said first to fourth input/output side faces, said laser light to be amplified, thus made incident, is reflected alternately by internal surfaces of said first and second reflecting side faces, and the laser light is emitted to the outside after at least eight passes in said laser medium.

2. A solid-state laser amplifier according to claim 1, further comprising:

two mirrors disposed opposite to each other on output optical paths of said third and fourth input/output side faces, said two mirrors guiding output light from one side face of either said third or fourth input/output side face to the other side face; and a 90° rotator disposed between said mirrors;

wherein said laser medium is so arranged that said first and second reflecting side faces are parallel to each other, said laser medium having a substantially symmetric shape with respect to a longitudinal axis parallel to these reflecting side faces;

wherein said pumping source comprises light sources positioned substantially in symmetry with respect to said longitudinal axis; and wherein said laser light to be amplified is linearly polarized laser light polarized in a predetermined first direction, said laser light being made incident to said laser medium through said first input/output side face.

3. A solid-state laser amplifier according to claim 2, further comprising:

first optical path switching means disposed on a main optical path connecting a light source of said laser light to be amplified with said laser medium, said first optical path switching means separating a linearly polarized light component in a second direction perpendicular to said first direction from incident light to output said linearly polarized light component on a first sub optical path different from said main optical path, thereby extracting only a linearly polarized light component in said first direction and outputting said linearly polarized light component in said first direction on the main optical path;

polarization direction converting means disposed between said first optical path switching means on said main optical path and said laser medium, said polarization direction converting means rotating a direction of polarization of said laser light to be amplified, emitted from said first optical path switching means, by 90° about a traveling direction of the light;

second optical path switching means disposed between said polarization direction converting means on said main optical path and said laser medium, said second optical path switching means separating a linearly polarized component in said first direction from incident light and outputting said linearly polarized component in said first direction on a second sub optical path different from said main optical path, thereby extracting only a linearly polarized light component in said second direction and outputting said linearly polarized light component in said second direction on the main optical path;

reentering means disposed on said second sub optical path, said reentering means guiding said laser light to be amplified, having been emitted from said first input/output side face of said laser medium and having been incident via said second optical path switching means into said second sub optical path, to said main optical path; and polarization direction converting/reentering means disposed on an output optical path of said second input/output side face of said laser medium, said polarization direction converting/reentering means rotating a direction of polarization of output light by 90° and thereafter making said output light reenter said laser medium through said second input/output side face.

* * * * *